United States Patent
Solberg et al.

(10) Patent No.: US 12,071,201 B2
(45) Date of Patent: Aug. 27, 2024

(54) VESSEL SECURE REMOTE ACCESS SYSTEM AND METHOD

(71) Applicant: KONGSBERG MARITIME AS, Kongsberg (NO)

(72) Inventors: Kenneth Solberg, Brattvåg (NO); Martin Lie, Brattvåg (NO); Arve Sivertsen, Brattvåg (NO)

(73) Assignee: KONGSBERG MARITIME AS, Kongsberg (NO)

( * ) Notice: Subject to any disclaimer, the term of this patent is extended or adjusted under 35 U.S.C. 154(b) by 809 days.

(21) Appl. No.: 17/257,838

(22) PCT Filed: Jul. 5, 2019

(86) PCT No.: PCT/NO2019/050141
§ 371 (c)(1),
(2) Date: Jan. 4, 2021

(87) PCT Pub. No.: WO2020/009587
PCT Pub. Date: Jan. 9, 2020

(65) Prior Publication Data
US 2021/0171158 A1    Jun. 10, 2021

(30) Foreign Application Priority Data

Jul. 5, 2018 (NO) .................................. 20180947

(51) Int. Cl.
*B63B 17/00* (2006.01)
*B63B 35/00* (2020.01)
(Continued)

(52) U.S. Cl.
CPC .............. *B63B 17/00* (2013.01); *B63B 79/40* (2020.01); *G07C 5/008* (2013.01);
(Continued)

(58) Field of Classification Search
CPC . B63B 17/00; B63B 79/40; B63B 2017/0009; B63B 2035/007;
(Continued)

(56) References Cited

U.S. PATENT DOCUMENTS 8,996,210 B2 * 3/2015 Kish ................. G05B 23/0213
701/32.4
2003/0193404 A1    10/2003 Joao
(Continued)

FOREIGN PATENT DOCUMENTS

CN    104777833 A    7/2015
CN    106846917 A    6/2017
(Continued)

OTHER PUBLICATIONS

Klinedinst et al.; On Board Diagnostics: Risks and Vulnerabilities of the Connected Vehicle; Software Engineering Institute—Carnegie Mellon University; Mar. 2016 (Year: 2016).*
(Continued)

*Primary Examiner* — Michael J Zanelli
(74) *Attorney, Agent, or Firm* — ArentFox Schiff LLP

(57) ABSTRACT

A vessel secure remote access system and method, comprising; a maintenance access device arranged on the vessel, configured to be connected to vessel operation systems and further to be connected to a remote service station via a first secure link, wherein the remote service station is configured to perform maintenance tasks on the vessel operation systems. A remote control switch is arranged on the vessel configured to be connected to a remote control station, via a second secure link, wherein a disabled state the maintenance access device blocks access to the vessel operation systems, and in an enabled state allows access to the vessel operation systems. The remote control switch is configured
(Continued)

to enable or disable the vessel maintenance access device based on commands from the remote control station.

12 Claims, 3 Drawing Sheets

(51) Int. Cl.
   *B63B 79/40* (2020.01)
   *G05D 1/00* (2024.01)
   *G07C 5/00* (2006.01)

(52) U.S. Cl.
   CPC . *B63B 2017/0009* (2013.01); *B63B 2035/008* (2013.01); *G05D 1/0088* (2013.01)

(58) Field of Classification Search
   CPC ... B63B 2035/008; B63B 35/00; G07C 5/008; G05D 1/0088; G05D 1/0206; H04L 12/4625
   See application file for complete search history.

(56) References Cited

U.S. PATENT DOCUMENTS

| | | |
|---|---|---|
| 2004/0243859 A1 | 12/2004 | Mueller et al. |
| 2007/0227429 A1 | 10/2007 | Okuyama et al. |
| 2015/0228127 A1* | 8/2015 | Ross .................. G07C 5/0808 701/31.4 |
| 2016/0012653 A1* | 1/2016 | Soroko .............. G07C 9/00309 340/5.61 |
| 2017/0084169 A1 | 3/2017 | Sinaguinan |
| 2017/0293302 A1 | 10/2017 | Johnson |
| 2017/0300054 A1 | 10/2017 | Hanson et al. |
| 2017/0372535 A1 | 12/2017 | Miller |

FOREIGN PATENT DOCUMENTS

| | | | | |
|---|---|---|---|---|
| KR | 20130070350 A | * | 6/2013 | ............. H04L 12/66 |
| WO | 2016007712 A1 | | 1/2016 | |

OTHER PUBLICATIONS

Yagdereli et al.; A study on cyber-security of autonomous and unmanned vehicles; Journal of Defense Modeling and Simulation: Applications, Methodology, Technology 2015, vol. 12(4) 369-381 (Year: 2015).*

Chinese Office Action issued in corresponding Chinese Application No. CN201980052215.9 dated Aug. 24, 2022.

Search Report issued in corresponding Norwegian Application No. 20180947 dated Jan. 25, 2019.

International Search Report issued in corresponding International Application No. PCT/NO2019/050141 dated Oct. 14, 2019.

Second Chinese Office Action issued in corresponding Chinese Application CN201980052215.9 dated Feb. 15, 2023.

* cited by examiner

VESSEL SECURE REMOTE ACCESS SYSTEM AND METHOD

This application is a 35 U.S.C. § 371 National Phase of PCT Application No. PCT/NO2019/050141, filed Jul. 5, 2019, which claims priority to Norwegian Application NO20180947, filed Jul. 5, 2018, the disclosures of which are hereby incorporated by reference herein.

TECHNICAL FIELD

The present invention relates to maintenance of operations systems onboard vessels, such as unmanned vessels, like remote controlled and autonomous vessels. It is further related to controlling remote access to maintenance networks onboard such vessels.

BACKGROUND

Remote and autonomous shipping is by many seen as the future of the maritime industry, especially for cargo. Common for both remotely operated and autonomous ships, is that the ships can be unmanned during long periods of time when the ships are at sea, which in turn can reduce human based errors and reduce costs considerably, since the accommodation and the deckhouse can be removed.

Remotely operated ships are manually operated from a remote control center over a communications interface, such as satellite communication system to ensure sufficient geographical coverage during the entire voyage, and a land based communication network for a higher bandwidth and lower latency communication close to harbor and land.

According to a strict definition of the highest level of autonomy, remote control should not be required for a fully autonomous ship. However, in real life, the operation of the ship can be subdivided into subtasks, which may have a varying degree of autonomy, and the subtasks with the least degree of autonomy will usually require more bandwidth. The degree of autonomy for a subtask will typically vary over time, depending on the state of the vessel, or the mission being executed. Therefore, a communications interface is still needed for e.g., real time supervision and maintenance of the ship, for mooring, for route adjustments and ship control underway for some legs, and as part of a fallback strategy.

Vessels have one or more vessel operations systems. Such operations systems may be related to propulsion, steering, power management. Modern vessels typically have a Dynamic Positioning (DP) System, Thruster Control System and a Rudder Control System. Further, autonomous vessels may have an Autonomous Navigation system and a Situational Awareness system communicating with one or more of the traditional systems.

To control these operations systems, a control network is typically deployed between the operations systems and a control station. Onboard the ship, this is typically a bus network. For remote and autonomous operated ships, this control station is remote, on shore.

There is also a maintenance network which may be of the same type as the control network, but the maintenance interfaces to the operations systems are typically different from the control interfaces. The maintenance interfaces are accessible via the maintenance network where the service engineers have access to lower level functions of the system.

Maintenance of the vessels is traditionally performed by service engineers on board the vessel, by allowing authorized service engineers to access the vessel and connect to the control systems via the maintenance network. This may include e.g. fault seeking, firmware/software upgrades and configuration changes. However, from time to time it is desirable to do at least some of the maintenance operations while the ship is at sea, such as from a maintenance system at shore.

A consequence of allowing external access to the maintenance network onboard the vessel is that it poses a substantial security risk, and should the maintenance network fall into the hands of unauthorized personnel, with the intention to take control of the ship, and even to perform malicious actions by means of the ship, the results could be catastrophic.

Similar, although probably less sever, could the result be if maintenance is performed on the ship by the authorized maintenance personnel outside the maintenance schedule or maintenance windows determined by the responsible for the ship control, e.g. the on shore captain.

It is therefore a need to control access to the vessels maintenance network, taking all this into consideration

SHORT SUMMARY

The invention solving the above mentioned problems is a vessel secure remote access system and a method for controlling remote access to a maintenance network on board a vessel according to the independent claims.

An effect of the invention is that maintenance can be performed both locally and remotely on vessel operations systems, and remote access can be controlled both from the vessel and from shore, where priority of the control is given to the vessel, when the vessel is manned by authorized personnel.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent or related embodiments defined in relation to the numbered embodiments are described. Unless otherwise specified, any embodiment that can be combined with one or more numbered embodiments may also be combined directly with any of the related embodiments of the numbered embodiment(s) referred to.

Figure 1:
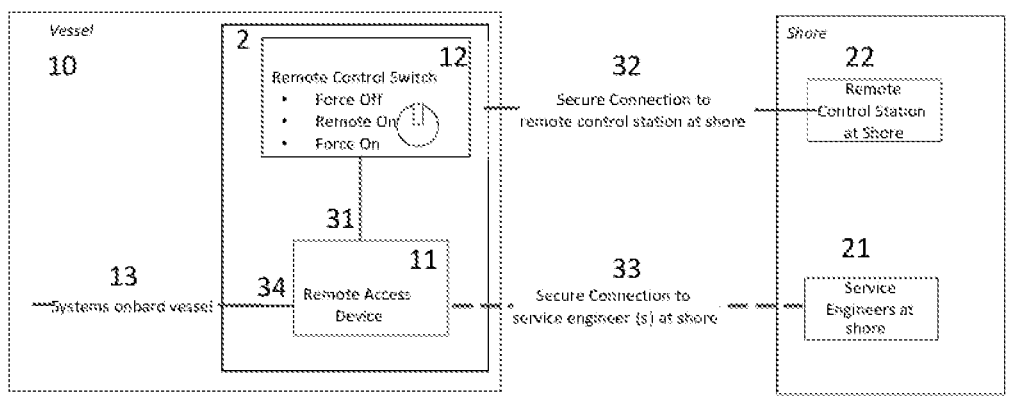
FIG. 1 illustrates in a simplified block diagram an embodiment of a vessel secure remote access system (1) comprising vessel access means (2), comprising a maintenance access device (11) and a remote control switch (12) arranged on a vessel (10). The maintenance access device (11) may be enabled and disabled from the remote control switch (12) to allow remote access to the vessel operation systems (13).

With reference to FIG. 1, the invention is in a first embodiment a vessel secure remote access system (1) comprising a maintenance access device (11) arranged on the vessel (10). The maintenance access device (11) is configured to be connected to be a remote service station (21) via a first secure link (33). The maintenance access device (11) is further configured to be connected to vessel operation systems (13), such that the remote service station (21) can perform maintenance tasks on the vessel operation systems (13). This requires that the maintenance access device (11) is enabled, allowing access to the maintenance network and to the vessel operation systems. In a disabled state the maintenance access device (11) blocks access to the vessel operation systems.

The connection from the maintenance access device (11) to the vessel operation systems would typically be via a maintenance network on-board the vessel segregated from other networks on board the same ship.

The vessel secure remote access system (1) further comprises a remote control switch (12) arranged on a vessel (10). The remote control switch (12) is configured to be connected to a remote control station (22), via a second secure link (32).

The remote control station (22) is external to the vessel, typically located on shore where a fleet of vessels may be supervised and controlled.

Different types of remote control stations can be connected to the vessel. E.g. a remote control station for supervision and control of the mission itself, such as control of the path and logistics related to freight. This could be the control center of a shipping company. Another control center could be assigned the role of managing the health of the vessel. This could be the control center of a shipyard managing a fleet of ships they have provided for different shipping companies. It could of course also be a single control center or a distributed control center with similar roles, e.g. with an on-shore captain, in the case the vessel is remotely operated or autonomous.

The remote control switch (12) is connected to the vessel maintenance access device (11), and configured to enable or disable the maintenance access device (11) based on commands from the remote control station (22).

The control switch (12) may be manually operated on board the vessel.

Figure 3:
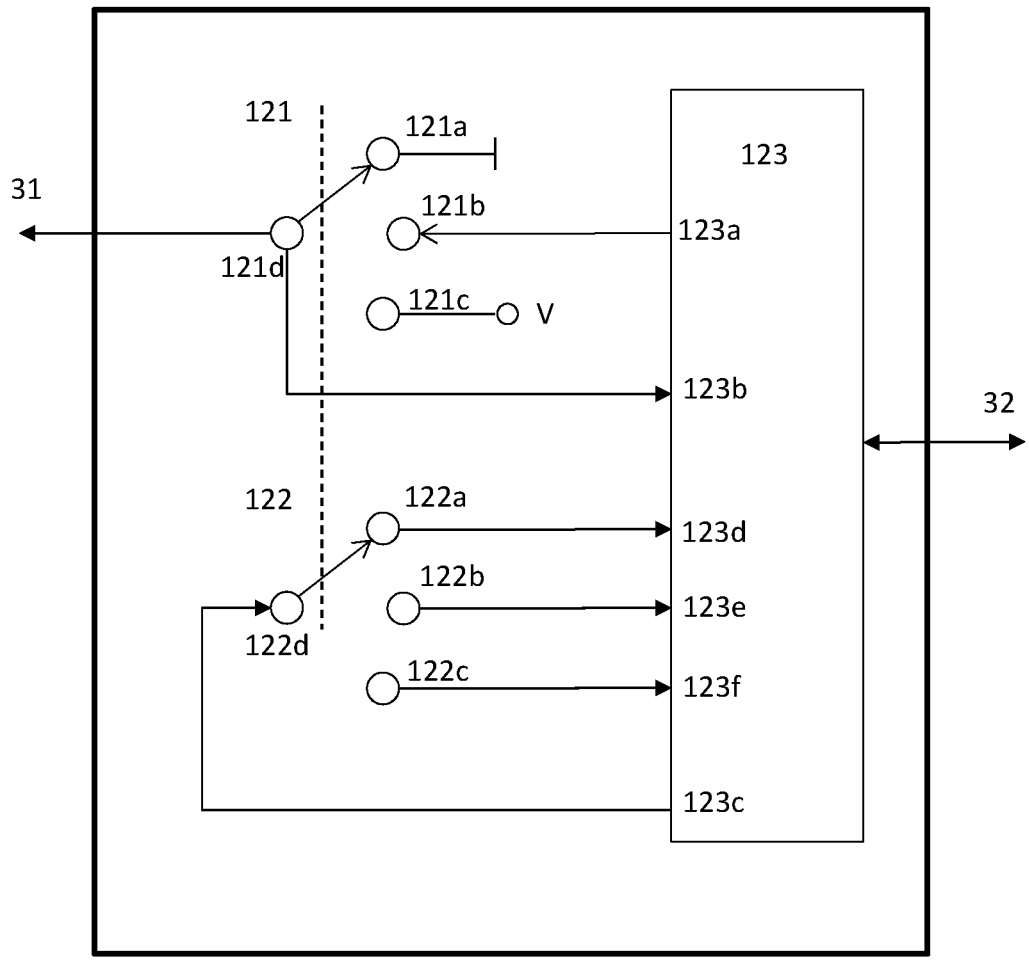
FIG. 3 illustrates an embodiment of a remote control switch (12) of a vessel secure remote access system (1).

In a related embodiment, the vessel secure remote access system (1) comprises a controller (123) as illustrated in FIG. 3, showing more details of an embodiment of the remote control switch (12). The controller may be physically located inside, or arranged external to the remote control switch (12).

In an embodiment that may be combined with the first embodiment above, the remote control switch (12) is a manual selector switch with a signal pole (121) comprising a forced remote OFF state (121a), wherein the maintenance access device (11) is disabled and the remote control station (22) is further disabled from enabling the vessel maintenance access device (11).

In a first related embodiment, the signal pole (121) comprises a remote ON state (121b), wherein the remote control station (22) is enabled to enable and disable the vessel maintenance access device (11).

In a second related embodiment that may be combined with the first related embodiment, the signal pole (121) comprises a forced remote on state (121c), wherein the vessel maintenance access device is enabled and the remote control station is disabled from disabling the vessel maintenance access device.

In a third embodiment that may be combined with any of the embodiments above, the switching between states of the remote control switch (12) is hardware driven. Hardware driven in this context means that the remote control switch (12) and the remote access device (11) are hardware elements, optionally physically integrated, and that the remote control switch (12) is connected to the remote access device (11) in such a way that the remote access device (11) can be disabled and enabled from the remote control switch (12) without use of software running on a processor. Switching therefore requires physical access to the remote control switch (12), reducing the possibility of accidental or intended tampering and access to the back end of the operations systems (13) on-board the vessel.

In a fourth embodiment that may be combined with any of the embodiments above, the remote control switch (12) comprises a verification pole (122) with first, second and third states (122a, 122b, 122c), wherein switching between states of the signal and verification poles (121, 122) are synchronized, and the states of the verification pole (122) are arranged for indicating a current state of the remote control switch (12).

In a related embodiment the controller (123) is in communication with the signal and verification poles (121, 122).

In FIG. 3 the dashed line indicates that the switching between states of the signal and verification poles (121, 122) are synchronized. E.g. when the signal pole (121) is in the forced remote OFF state (121a), the verification pole (122) is in the first state (122a), when the signal pole (121) is in the remote ON state (121b), the verification pole (122) is in the second state (122b), and when the signal pole (121) is in the forced remote ON state (121c), the verification pole (122) is in the third state (122c).

Each of the first, second and third states (122a, 122b, 122c) may be connected to corresponding first, second and third verification inputs (123d, 123e, 123f) respectively, on the controller (123), and the controller has a verification output signal (123c) that may be connected to the common connector (122d) of the verification pole (122). In this case, if the controller detects that the same signal as the verification output signal (123c) is detected on one of the first, second and third verification inputs (123d, 123e, 123f), and optionally at the same time detects that it is not present on the other two, the actual state of the remote control switch (12) state may be sent back to the remote control station (22) via the second secure link (32).

In a related embodiment, the signal and verification poles (121, 122) are arranged in separate decks, and the remote control switch could be e.g. a 2P3T rotational switch.

In a related embodiment, the controller (123) is arranged for verifying a current state of the control switch (12) by comparing the states of the verification pole (122) with an output signal (31) from the first signal pole (121).

The controller (123) may comprise a first signal pole monitoring input (123b) connected to the common pole (121d) of the first signal pole (121). If the output signal (31) from the first signal pole (121) is enabled, the controller will be detect an enable signal on the first signal pole monitoring input (123b), e.g. 24V, and conversely a disabled signal if the output signal (31) is a disable signal. Since the output signal (31) should always be disabled when the remote control switch (12) is in the forced remote OFF state (121a), and always enabled when the remote control switch (12) is in the forced remote ON state (121c), proper operation of the switch can be verified, by comparing these values with the values on the first, second and third verification inputs (123d, 123e, 123f) in the controller (123).

In a fifth embodiment the invention is a method for controlling remote access to a maintenance network on board a vessel comprising switching locally on board the vessel between the states;
  remote on, where the remote control station is enabled to enable or disable remote access to the maintenance network,
  force off, where remote access to the maintenance network is disabled and where the remote control station is disabled from enabling remote access to the maintenance network,
  forced on, where remote access to the maintenance network is enabled and where the remote control station is disabled from disabling remote access to the maintenance network.

In a first related embodiment the switching is hardware driven.

In a second related embodiment that can be combined with the method above and the first related embodiment the vessel comprises a vessel secure remote access system (1), according to any of the embodiments above, where the remote control switch (12) is configured for the switching between the states.

As long as it has been predefined what codifies an enabled state and a disabled state, the specific type of signals between the devices is not important. E.g. the signals used as enabling signals may have a positive voltage, such as e.g. 24V DC, and disabling signals may have a zero voltage, 0V. However, other DC and AC voltages, as well as coded signals could also be used.

The remote OFF state (121a), as illustrated in FIG. 3, could e.g. be represented by 0V, or termination. When the signal pole (121) of the remote switch (12) is in this position, the 0V output signal (31) fed to the maintenance access device (11) indicates to the maintenance access device (11) that it should operate in the disabled state. This means that connection between the remote service station (21) and the maintenance network (34) on board the vessel is broken, and cannot be altered remotely.

Further, when the signal pole (121) of the remote switch (12) is in the remote ON state (121b) it is the signal (123a) from the controller (123) that determines the output signal (31). If e.g. the signal (123a) from the controller is 24V, the output signal (31) will also be 24 V, which is seen as an enable state by the vessel maintenance access device (11). If, on the other hand e.g. the signal from the controller is 0 V., this will disable the vessel maintenance access device (11). Since the controller (123) is connected to the remote control station (22) via a secure link (32), the remote control station may give or deny remote access to the management network (34) and remote maintenance of the systems on board the vessel.

When the signal pole (121) of the remote switch (12) is in the forced remote ON state (121c) the maintenance access device (11) is continuously enabled and maintenance can be performed from the remote service station (21) independently of the commands from the remote control station (22).

Figure 2:
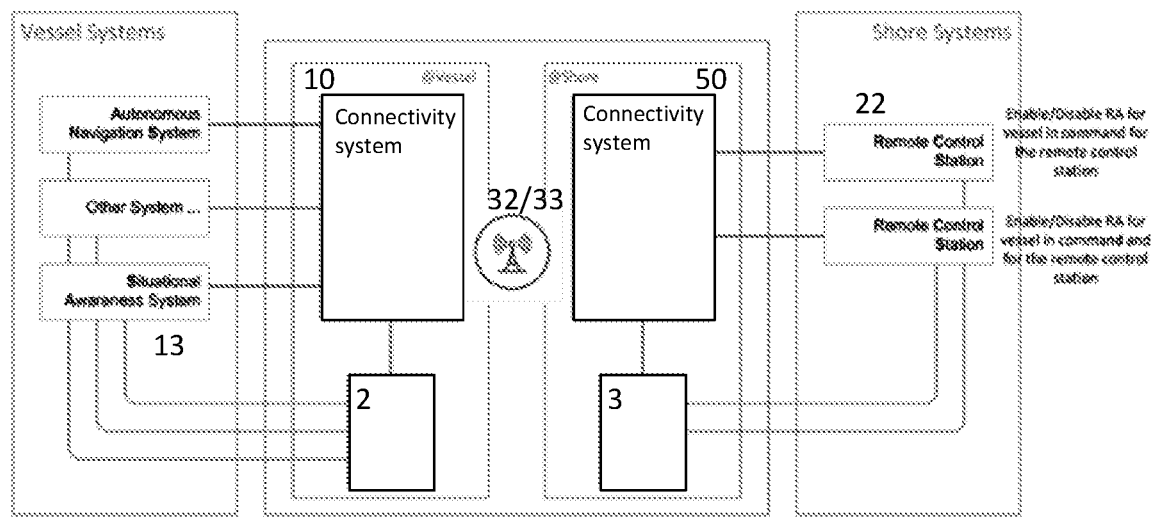
FIG. 2 illustrates in a block diagram an embodiment of a vessel secure remote access system (1), comprising the same vessel access means (2), onboard the vessel (10) as in FIG. 1. In addition it comprises shore access means (3) functionally identical to the vessel access means (2). A shore maintenance access device, identical to the vessel maintenance access device (11) may be enabled and disabled from a shore remote control switch, identical to the remote control switch (12) onboard the vessel, to allow remote access from a service station on shore (not shown) to the shore operation systems (not shown).

On the shore (50) side there may also be a number of servers and back-end systems needed for operation of remote control or autonomous ships. In order to provide secure sailing of the vessel, it is therefore equally important to maintain control of the access for maintenance of these land based operations systems. In an embodiment that may be combined with any of the embodiments above, the vessel secure remote access system (1) comprises shore access means (3) arranged on shore (50), as illustrated in FIG. 2. The land based operations systems are not illustrated in the drawings, but would be accessed through a shore maintenance access device similar to the vessel maintenance access device (11). The shore access means (3) may further be similar to any of the embodiments of the vessel access means (2), except that they are land based.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:
1. A vessel secure remote access system, comprising;
  a maintenance access device arranged on the vessel, wherein the maintenance access device is configured to be connected to vessel operation systems and further to be connected to a remote service station via a first secure link, wherein the remote service station is configured to perform maintenance tasks on the vessel operation systems, and
  a remote control switch arranged on the vessel configured to be connected to a remote control station, via a second secure link,
  wherein a disabled state of the maintenance access device blocks access to the vessel operation systems, and in an enabled state allows access to the vessel operation systems, and wherein the remote control switch is configured to enable or disable the vessel maintenance access device based on commands from the remote control station, and
  wherein the remote control switch is a manual selector switch comprising a forced remote off state, wherein the maintenance access device is disabled and the remote control station is disabled from enabling the vessel maintenance access device.

2. The vessel secure remote access system of claim 1, wherein the remote control switch can be manually operated on-board the vessel.

3. The vessel secure remote access system of claim 1, wherein the remote control switch is a manual selector switch with a signal pole.

4. The vessel secure remote access system of claim 3 wherein the signal pole comprises a remote on state, wherein the remote control station is enabled to enable and disable the vessel maintenance access device.

5. The vessel secure remote access system of claim 3, wherein the signal pole comprises a forced remote on state, wherein the maintenance access device is enabled and the remote control station is disabled from disabling the vessel maintenance access device.

6. The vessel secure remote access system of claim 3, wherein the remote control switch comprises a verification pole with states, wherein switching between states of the signal and verification poles are synchronized, and the states of the verification pole are arranged for indicating a current state of the remote control switch.

7. The vessel secure remote access system of claim 6, wherein the signal and verification poles are arranged in separate decks of the remote control switch.

8. The vessel secure remote access system of claim 6, comprising a controller in communication with the signal and verification poles, wherein the controller is arranged for verifying a current state of the remote control switch by comparing the states of the verification pole with an output signal from the signal pole.

9. The vessel secure remote access system of claim 1, wherein switching between states of the remote control switch is hardware driven.

10. A method for controlling remote access to a maintenance network on board a vessel comprising:
switching locally on board the vessel between states;
remote on, enabling a remote control station to enable or disable the remote access to the maintenance network,
forced off, disabling the remote access to the maintenance network and disabling the remote control station from enabling remote access to the maintenance network,
forced on, enabling the remote access to the maintenance network and disabling the remote control station from disabling remote access to the maintenance network.

11. The method of claim 10, wherein the switching is hardware driven.

12. The method of claim 10 further comprising:
providing a vessel secure remote access system for controlling the remote access to the maintenance network, wherein the vessel secure remote access system comprises:
a maintenance access device arranged on the vessel, wherein the maintenance access device is configured to be connected to a vessel operation systems and further to be connected to a remote service station via a first secure link, wherein the remote service station is configured to perform maintenance tasks on the vessel operation systems, and
a remote control switch arranged on the vessel configured to be connected to the remote control station, via a second secure link,
wherein a disabled state of the maintenance access device blocks access to the vessel operation systems, and in an enabled state allows access to the vessel operation systems, and wherein the remote control switch is configured to enable or disable the maintenance access device based on commands from the remote control station, wherein switching between states of the remote control switch is hardware driven.

* * * * *